(12) United States Patent
Schwacke

(10) Patent No.: US 9,464,644 B2
(45) Date of Patent: Oct. 11, 2016

(54) FOUR-CHAMBER CYLINDER FOR A HYDRAULIC ACTUATING DEVICE WITH EMERGENCY FUNCTION AND HYDRAULIC ACTUATING DEVICE HAVING THIS

(71) Applicant: Robert Bosch GmbH, Stuttgart (DE)

(72) Inventor: Johannes Schwacke, Bad Orb (DE)

(73) Assignee: Robert Bosch GmbH, Stuttgart (DE)

( * ) Notice: Subject to any disclaimer, the term of this patent is extended or adjusted under 35 U.S.C. 154(b) by 301 days.

(21) Appl. No.: 14/314,078

(22) Filed: Jun. 25, 2014

(65) Prior Publication Data

US 2014/0373710 A1  Dec. 25, 2014

(30) Foreign Application Priority Data

Jun. 25, 2013  (DE) .......................... 10 2013 211 990
Aug. 19, 2013  (DE) .......................... 10 2013 216 346

(51) Int. Cl.
| | |
|---|---|
| *F15B 15/10* | (2006.01) |
| *F15B 15/14* | (2006.01) |
| *F15B 20/00* | (2006.01) |
| *F16K 17/04* | (2006.01) |
| *F15B 15/18* | (2006.01) |

(52) U.S. Cl.
CPC ........... *F15B 15/1409* (2013.01); *F15B 20/00* (2013.01); *F16K 17/04* (2013.01); *F15B 15/1476* (2013.01); *F15B 15/18* (2013.01); *F15B 2211/20561* (2013.01); *F15B 2211/27* (2013.01); *F15B 2211/3058* (2013.01); *F15B 2211/30505* (2013.01); *F15B 2211/30565* (2013.01); *F15B 2211/7055* (2013.01); *F15B 2211/8752* (2013.01)

(58) Field of Classification Search
CPC ................................................... F16K 31/1225
USPC ........................................ 251/66, 68, 69, 73
See application file for complete search history.

(56) References Cited

FOREIGN PATENT DOCUMENTS

| | | |
|---|---|---|
| DE | 197 23 624 A1 | 2/1998 |
| DE | 101 52 414 A1 | 5/2003 |
| DE | 103 08 017 B4 | 12/2005 |
| DE | 10 2010 011 516 A1 | 9/2011 |
| WO | WO 2012104046 A1 * | 8/2012 ............ F15B 20/008 |

* cited by examiner

*Primary Examiner* — Thomas E Lazo
(74) *Attorney, Agent, or Firm* — Maginot, Moore & Beck LLP

(57) ABSTRACT

A four-chamber cylinder comprises a first piston device including a first piston and a first piston rod, the first piston delimiting a first chamber and a second chamber, a second piston device including a second piston and a second piston rod aligned with the first piston rod, the second piston delimiting a third chamber and a fourth chamber, and a compressive-elastic emergency element. The first piston, via the first chamber, and the second piston, via the fourth chamber, are configured to move towards each other and held with each other to tension the compressive-elastic emergency element. With the four-chamber cylinder according to the disclosure, an actuating movement is possible via the emergency spring even in the case of a supply failure, wherein the four-chamber cylinder can be installed and operated bi-directionally.

18 Claims, 8 Drawing Sheets

FOUR-CHAMBER CYLINDER FOR A HYDRAULIC ACTUATING DEVICE WITH EMERGENCY FUNCTION AND HYDRAULIC ACTUATING DEVICE HAVING THIS

This application claims priority under 35 U.S.C. §119 to patent application no. DE 10 2013 211 990.9, filed on Jun. 25, 2013 in Germany, the disclosure of which is incorporated herein by reference in its entirety, and to patent application no. DE 10 2013 216 346.0, filed on Aug. 19, 2013 in Germany, the disclosure of which is also incorporated herein by reference in its entirety.

The disclosure relates to a hydraulic actuating device and a four-chamber cylinder suitable for this, which serves for adjusting a safety-relevant part, and which enables an emergency function in the case of a supply failure to the actuating device.

BACKGROUND

Shown in printed publication DE 101 52 414 A1 and in printed publication DE 197 23 624 A1 are hydraulic actuating devices for adjusting valve bodies with a fixed mechanical coupling between a cylinder and the valve body. The valve body is pretensioned into the closed position of the valve by means of an emergency spring, via which the valve can be closed during an emergency operation.

It is disadvantageous to such hydraulic actuating devices that with each adjustment movement of the valve body by means of the actuating device the emergency spring is relaxed or tensioned.

Printed publication DE 103 08 017 B4 shows a hydraulic actuating device with a mechanical coupling device and with an emergency spring, wherein during a control operation or normal operation the emergency spring in the tensioned state is moved together with the coupling device. When the emergency closing function is activated, a bell-crank lever device is activated so that the emergency spring is relaxed and the mechanical coupling device is expanded or extended in the process. As a result, the valve is closed.

A disadvantage of the last-named actuating devices is the equipment-engineering cost for the mechanical activation function which has to be together with movement of the emergency spring during normal operation.

DE 10 2010 011 516 A1 shows a hydraulic actuating device with a mechanical coupling device, wherein during normal operation the emergency spring in the tensioned state is moved along with the coupling device. During emergency operation, a locking device, which keeps the emergency spring in the tensioned state, is activated so that the emergency spring is relaxed and the coupling device is expanded or extended in the process. As a result, the valve is closed. Proposed for this is a hydraulic locking device with two pistons which during normal operation are pressed against each other via pressure medium, wherein during emergency operation the pressure medium is relieved and the pressing is terminated.

A disadvantage of such hydraulic adjusting devices is the equipment-engineering cost on the one hand for the hydraulics which are required for the positioning control, and on the other hand for the hydraulics which are required for the locking device, which cost can be recognized by two separate cylinders, for example.

SUMMARY

In contrast to this, the disclosure is based on the object of creating a hydraulic actuating device and an actuating cylinder suitable for it, which requires little installation space and at the same time can be flexibly bi-directionally installed and operated and, moreover, is volumetrically balanced.

This object is achieved by means of a four-chamber cylinder, and a hydraulic actuating device with a four-chamber cylinder according to the claims.

The four-chamber cylinder according to the disclosure has two piston devices which in each case have a piston and a piston rod. The first piston delimits a first chamber, via which a pressure force can be applied to the first piston device in the direction towards the second piston device, and it also delimits a second chamber which acts in an opposing manner to the first chamber and via which a pressure force can be applied to the first piston device in the direction away from the second piston device. Correspondingly, the second piston delimits a fourth chamber, via which a pressure force can be applied to the second piston device in the direction towards the first piston device, and it also delimits a third chamber which acts in an opposing manner to the fourth chamber and via which a pressure force can be applied to the second piston device in the direction away from the first piston device. The piston rods are in alignment with each other, wherein the first piston rod can immerse telescopically, at least in sections, in a guide recess of the second piston rod. The second piston rod can be simply constructed as a tube for this purpose. The two piston devices, by means of pressure being applied to the first chamber and the fourth chamber, can be brought into contact with each other and held there. As a result, a compressive-elastic emergency element (e.g. an emergency spring) is pretensioned and held there, and in the case of a supply failure of the four-chamber cylinder can be relaxed during an emergency operation and can create an emergency movement. Created as a result is a compactly built four-chamber cylinder which serves for adjusting a valve, a turbine or a process valve upon which increased safety demands are made since it is used in power plants, for example. The four-chamber cylinder according to the disclosure can be bi-directionally installed and operated. Therefore, a closing body of a valve, for example, can be coupled to the first piston device or to the second piston device, or be fastened thereupon, and in both cases the full functioning scope (especially including the functions of emergency element tensioning, control operation and emergency operation) is ensured.

Further advantageous embodiments of the disclosure are described in the claims.

During a control operation of the four-chamber cylinder according to the disclosure, in which both piston devices are in contact with each other, it is especially preferable if an end face of the second piston rod covers a partial pressure surface of a total pressure surface formed between the second chamber and the first piston, and therefore "shuts off" the influence of the pressure of the second chamber upon the first piston or the first piston device. In this case, the pressure surface, on which the pressure of the second chamber acts, is reduced to a so-called differential pressure surface (=total pressure surface less partial pressure surface), and the second chamber is reduced in size by the second piston rod. As a result, the effect of the pressure in the second chamber can be altered in dependence upon the operating state of the device.

The partial pressure surface is especially reliably "shut off" if the coverable partial pressure surface is arranged in a piston-side recess into which an end section of the second piston rod can immerse by the end face. The end section or the recess is preferably provided with a seal in this case.

Optionally, the pressure surfaces of the four-chamber cylinder according to the disclosure can be designed so that when pressure is applied to the partial pressure surface no change of the function or the operation takes place. Therefore, the influence of the partial pressure surface is neutralized.

During control operation, it is advantageous if the second chamber and the third chamber act upon the two coupled piston devices according to the principle of a through-rod cylinder. In this case, the differential pressure surface and a third pressure surface formed between the third chamber and the second piston should be of equal size.

If the total pressure surface and a first pressure surface formed between the first chamber and the first piston are of equal size, the pressure medium can be circulated from the first chamber into the second chamber during emergency operation as a result of the force of the emergency element without pressure medium having to be drawn in or discharged in the process.

If the total pressure surface and a fourth pressure surface formed between the fourth chamber and the second piston are of equal size, the pressure medium can be delivered from the first chamber into the fourth chamber, and vice versa, via a displacement machine—especially a pump—during control operation without pressure medium having to be drawn in or discharged.

The first piston device preferably has an outer piston rod which penetrates a first end-side baseplate of a cylinder tube of the four-chamber cylinder, and which delimits the first chamber which is formed as an annulus, whereas the second piston device has an outer piston rod which penetrates a second end-side cover of the cylinder tube of the four-chamber cylinder, and which delimits the fourth chamber which is formed as an annulus. An end section of the compressive-elastic emergency element, which can encompass the cylinder tube, can then be coupled to each additional piston rod.

The first piston rod, which extends in the direction towards the second piston arrangement, and the first outer piston rod, which extends outwards in an opposing manner to it, can be designed as a one-piece rod or as a one-piece tube in a simple manner with regard to equipment engineering. The tube preferably has an equal outside and inside diameter.

The second piston rod, which extends in the direction towards the first piston arrangement, and the second outer piston rod, which extends outwards in an opposing manner to it, can be designed as a one-piece rod or as a one-piece tube in a simple manner with regard to equipment engineering. The tube preferably has a stepped outer and inner surface.

If the two outer piston rods have equal outside diameters, and if the cylinder tube has an equal inside diameter in the region of the first chamber and in the region of the fourth chamber, two pistons with equal outside diameter, especially two identical pistons, can be installed. Also, the two piston devices can be arranged in a manner rotated in their direction in relation to the housing. Therefore, with the same installed position, the effective direction of the emergency element is rotated. Therefore, depending on the installed position of the two piston devices during emergency operation by the emergency element, an extending movement or a retracting movement can be created.

The second chamber and the third chamber are preferably separated from each other by means of a radial constriction of the cylinder tube in which the second piston rod is guided.

The hydraulic actuating device according to the disclosure has a previously-described four-chamber cylinder, the second chamber and the third chamber of which can be supplied in an alternating and bi-directional manner via a respective main line and the displacement machine which is arranged between them. As a result, during control operation the two piston devices, which are coupled to each other, can be moved and therefore their position can be adjusted.

For the construction of the hydraulic coupling of the two piston devices, it is preferred if the first chamber and the fourth chamber can be commonly supplied with pressure medium and pressurized by the displacement machine via a coupling line which connects the first chamber and the fourth chamber. As a result, a construction of the tensioning of the compressive-elastic emergency element via the displacement machine is possible.

For the coupling of the two piston devices, it is preferred if the first chamber and the fourth chamber can be interconnected, and therefore hydraulically coupled or locked, via the coupling line which can be outwardly shut off. Therefore, a coupling pressure or closing pressure, which presses the two piston devices together, can be maintained in the two chambers and in the coupling line, and via which during normal operation the tensioning of the compressive-elastic emergency element can be maintained by the pressure medium being circulated between the first chamber and the fourth chamber, with as little resistance as possible.

The coupling line can be connected to the main line via a check valve which opens from the main line to the coupling line so that after build-up of the coupling or closing pressure via the main line this can also be operated with lower pressure, especially with return pressure, during control operation.

In the coupling line, there is advantageously a piloted check valve which opens from the first chamber to the fourth chamber and is operated to open via a 3/2 directional valve during control operation and closed during emergency operation.

For emergency operation, in which a fast movement, e.g. fast closing of the valve, has to be achieved, the first chamber and the second chamber can be interconnected via an emergency closing line and a logic valve which is arranged therein, wherein the logic valve can be unloaded via the 3/2 directional valve and therefore be opened. The first piston arrangement can be moved away from the second piston arrangement during emergency operation by means of the force of the emergency energy accumulator and therefore enable fast closing. Furthermore, a nozzle for damping the fast closing can be arranged in the emergency closing line.

The two main lines are preferably connected to an accumulator via a respective replenishing valve. This can be comparatively small since it only has to compensate volume differences on account of temperature differences and different pressures (compressibility volumes). It can be designed as a piston accumulator which is integrated in an end-side cover.

A respective shut-off valve is preferably provided in the two main lines. An immediate control readiness of the four-chamber cylinder according to the disclosure is achieved if, parallel to the second shut-off valve of the second main line, provision is made for a line in which are provided a check valve which opens from the third chamber to the displacement machine and a spring-pretensioned check valve which opens from the displacement machine to the third chamber. The spring-pretensioned check valve can be operated to open via a control line, which is connected to the first main line, in dependence upon the pressure which prevails between the displacement machine and the first shut-off valve.

BRIEF DESCRIPTION OF THE DRAWINGS

In the following text, different exemplary embodiments of the disclosure are described in detail with reference to the figures. In the drawings.

DETAILED DESCRIPTION

Figure 1:
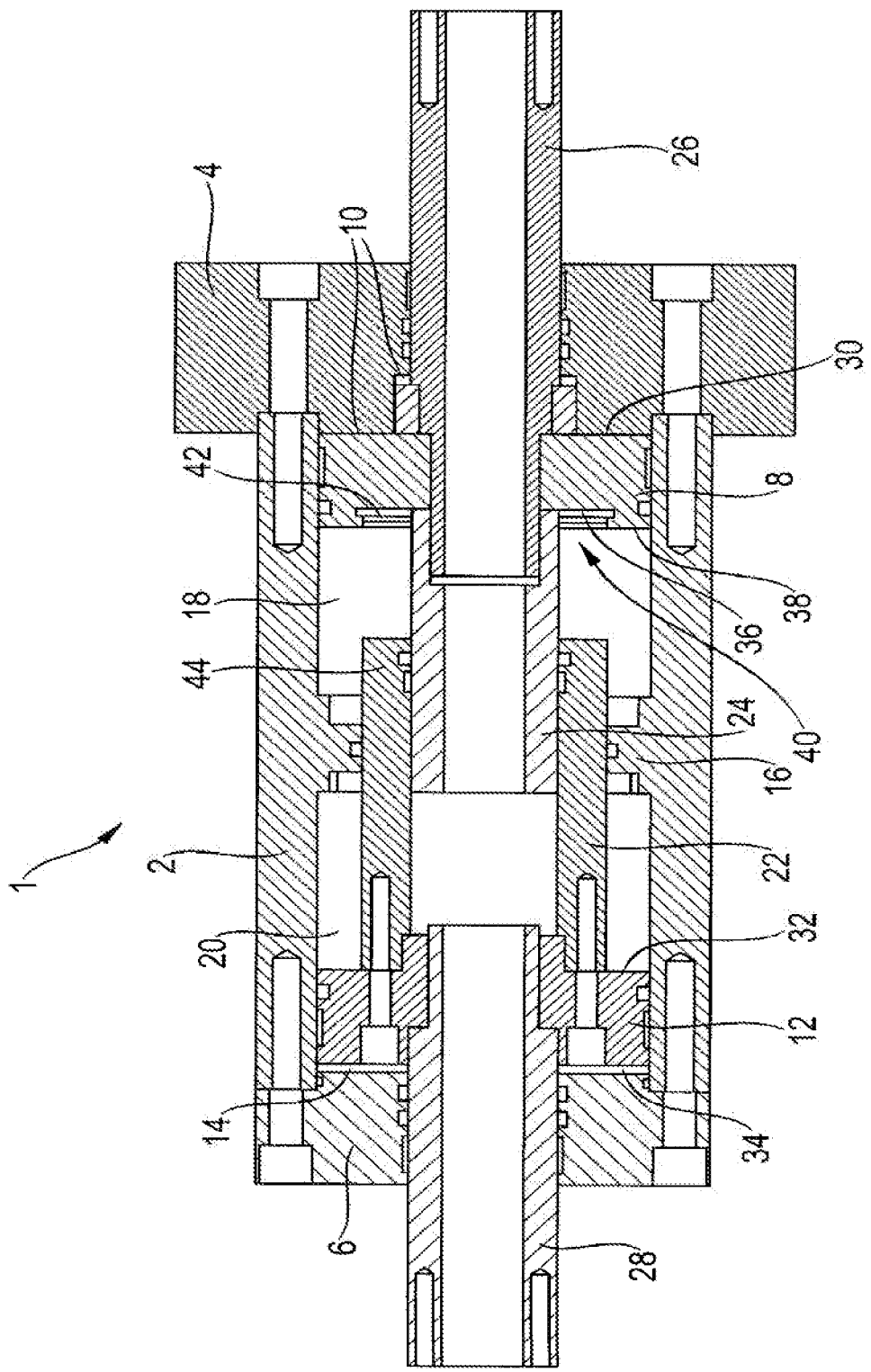
FIG. 1 shows a first exemplary embodiment of the four-chamber cylinder according to the disclosure in laterally sectioned view.

FIG. 1 shows the essential part of an exemplary embodiment of the four-chamber cylinder 1 according to the disclosure in a laterally sectioned view. It has a cylinder tube 2 which on one side is covered by a first end-side cover 4, formed as a baseplate, and on the other side is covered by a second end-side cover 6. An emergency spring (not shown in FIG. 1), which is explained with reference to the following figures, is arranged on the outer circumference of the cylinder tube 2.

Accommodated inside the four-chamber cylinder 1 is a first piston 8 which together with the first cover 4 delimits a first chamber 10, the size of which is minimal in FIG. 1. Also accommodated inside the four-chamber cylinder 1 is a second piston 12 which together with the second cover 6 delimits a fourth chamber 14 which is shown to be comparatively small in FIG. 1.

A radial constriction 16 or a radial step is provided centrally in the cylinder tube 2, wherein a second chamber 18 is formed between the first piston 8 and the radial constriction 16, whereas a third chamber 20 is formed between the second piston 12 and the radial constriction 16.

Fastened on the second piston 12 is a second tubular piston rod 22 which is guided in the radial constriction 16 and delimits the third chamber 20 on the inside. In this case, the second piston rod 22 projects into the second chamber 18 of the four-chamber cylinder 1 in dependence upon the position of the second piston 12. Fastened on the first piston 8 is a first piston rod 24 which is guided in the second piston rod 22 and projects into said second piston rod 22 in dependence upon the positions of the two pistons 8, 12. In this case, the first piston rod 24 delimits the second chamber 18 on the inside.

Furthermore, respective additional piston rods 26, 28 are fastened on the two pistons 8, 12, wherein the first additional piston rod 26 penetrates the first cover 4 and projects out of the four-chamber cylinder 1 (to the right in FIG. 1) in dependence upon the position of the piston 8. Correspondingly, the second additional piston rod 28 penetrates the second cover 6 and projects out of the four-chamber cylinder 1 (to the left in FIG. 1) in dependence upon the position of the second piston 12.

The first piston 8 has an annular first pressure surface 30, facing the first chamber 10, and the second piston 12 has an annular third pressure surface 32, facing the third chamber 20, and an annular fourth pressure surface 34, facing the fourth chamber 14. A total pressure surface, which is divided into an annular inner partial pressure surface 36 and into an outer annular differential pressure surface 38, is provided between the first piston 8 and the second chamber 18. The partial pressure surface 36 is provided at the bottom of an annular axial recess 40, on the outer circumference of which an encompassing radial seal 42 is provided. The inner circumference of the seal 42 corresponds to the outer circumference of the end section 44 of the second piston rod 22 which is oriented towards the first piston 8. By pressurizing the first chamber 10 and/or the fourth chamber 14 the two pistons 8, 12 are able to be moved towards each other. At the end of this movement, the end section 44 of the second piston rod 22 immerses into the recess 40 of the first piston 8 and is sealed on its circumference by means of the seal 42. As a result, the second chamber 18 is reduced in size and its pressure surface which acts upon the first piston 8 is reduced to the outer differential pressure surface 38 since the inner partial pressure surface 36 is covered.

Figure 2:
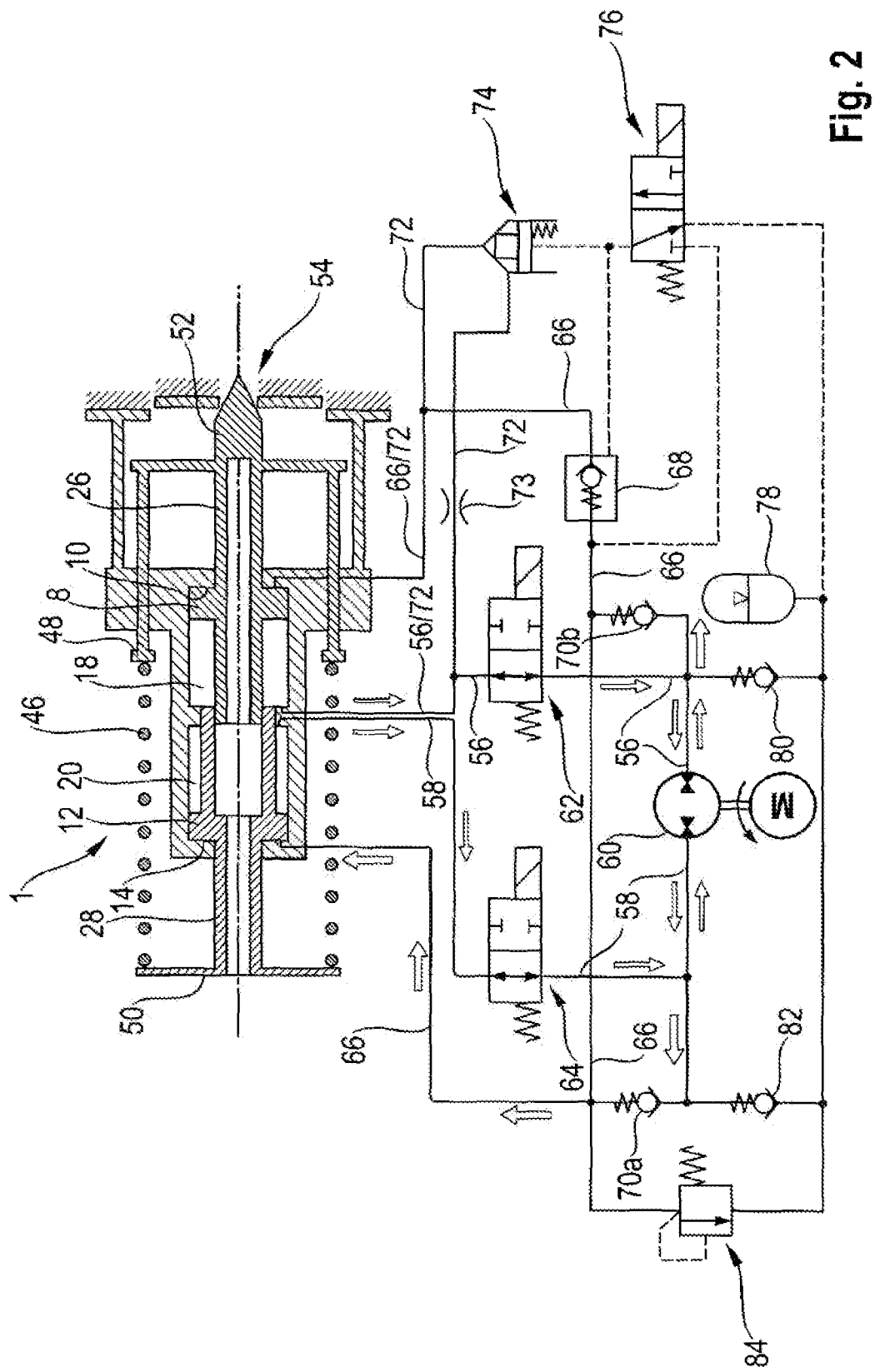
FIG. 2 shows a first exemplary embodiment of the actuating device according to the disclosure in a first operating state.

FIG. 2 shows an exemplary embodiment of the actuating device according to the disclosure with the four-chamber cylinder 1 according to FIG. 1 during the tensioning of the emergency spring 46. This is designed as a compression spring and is arranged, for example, rotationally symmetrically on the outer circumference of the four-chamber cylinder 1 or of the cylinder tube 2. In this case, the emergency spring 46 is clamped between a first spring abutment 48 and a second spring abutment 50. The first spring abutment 48 is fastened on the first outer piston rod 26 and therefore on the first piston 8, whereas the second spring abutment 50 is fastened on the second outer piston rod 28 and therefore on the second piston 12. Also fastened on the first outer piston rod 26 is a valve body 52 via which a safety-relevant main valve 54 of a power plant can be operated to open and close.

The second chamber 18 and the third chamber 20 are connected, or can be connected, via a respective main line 58, 56 to the two pressure ports of a displacement machine 60 which can operated as a pump and is driven by a motor M. Arranged in the two main lines 56, 58 is a respective shut-off valve 62, 64, designed as a switching valve, which is open in an initial, respective spring-pretensioned position (shown in FIG. 1), and can be closed by energizing an actuator.

The first chamber 10 and the fourth chamber 14 are interconnected, or can be interconnected, via a coupling line 66. In this case, a hydraulically piloted check valve 68, the opening direction of which is oriented from the first chamber 10 to the fourth chamber 14, is provided in the coupling line 66. The coupling line 66, in a region between the check valve 68 and the fourth chamber 14, is connected to the first main line 56 via a check valve 70b and connected to the second main line 58 via a check valve 70a, wherein the opening directions of the check valves 70a, 70b are oriented from the main line 56, 58 to the coupling line 66.

The first chamber 10 and the second chamber 18 are interconnected, or can be interconnected, via an emergency closing line 72 in which are arranged a restrictor 73 and a logic valve 74. The logic valve 74 can open or close a connection from the first chamber 10, via the emergency closing line 72, to the second chamber 18 in dependence upon a control pressure. The control pressure for the logic valve 74 also acts as control pressure for the hydraulically piloted check valve 68 and is tapped from the coupling line 66 in the region between the check valve 68 and the fourth chamber 14. This tapped control pressure is communicated to the two valves 68, 74 via a 3/2 directional valve 76, designed as a switching valve, with an energized actuator, or the control pressure of the two valves 78, 74 is relieved via an initial spring-pretensioned position of the 3/2 directional valve to a comparatively small low-pressure accumulator 78.

The two main lines 56, 58 are connected via a respective replenishing valve 80, 82 to the low-pressure accumulator 78. The coupling line 66 is protected via a pressure limiting valve 84 which is connected on the low pressure side to the low-pressure accumulator 78.

In the operating state shown in FIG. 2, the emergency spring 46 is tensioned for preparation of a control operation. To this end, the two shut-off valves 62, 64 are de-energized open and the 3/2 directional valve 76 is located in its initial position so that the check valve 68 is closed, whereas the logic valve 74 is open. The displacement machine 60 draws in pressure medium from the second chamber 18 and delivers this to the fourth chamber 14 via the open check valve 70a, according to the arrows a, or via the open check valve 70b and a section of the coupling line 66, according to the arrows b. In this case, the second piston 12 is moved (to the right in FIG. 2), as a result of which pressure medium is displaced from the third chamber 20. This is added or fed via the second main line 58 to the pressure medium which is delivered directly by the displacement machine 60 and therefore also delivered to the fourth chamber 14.

Figure 3:
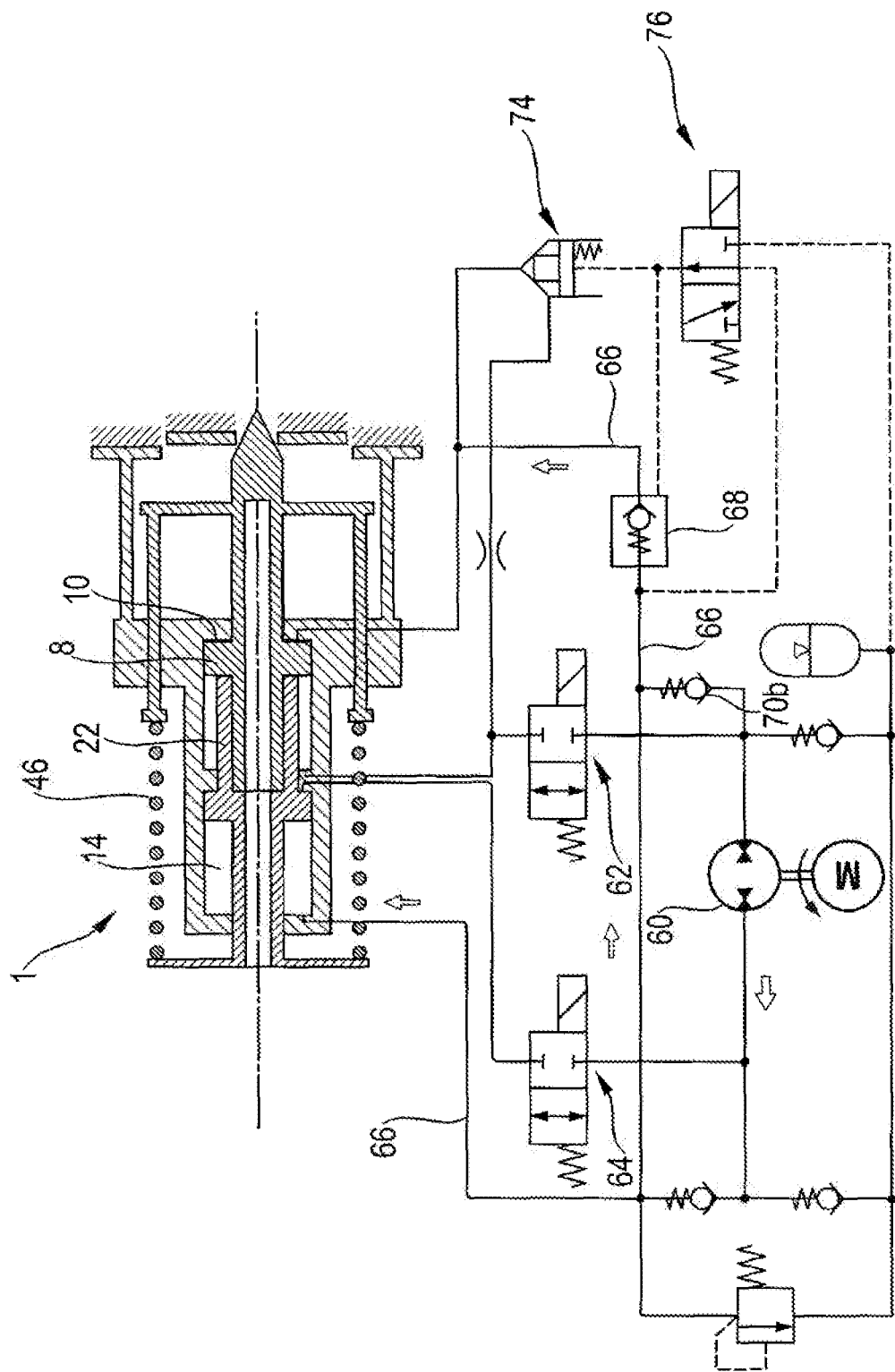
FIG. 3 shows the actuating device according to FIG. 2 in a second operating state.

FIG. 3 shows the actuating device according to FIG. 2 after the second piston rod 22 has come into contact with the first piston 8 and therefore the emergency spring 46 is tensioned to its maximum. In the operating state shown in FIG. 3, a pressure is built up in the first chamber 10 and in the fourth chamber 14 and exceeds the pressure equivalent of the emergency spring 46 in order to reliably hold this in the pretensioned position during control operation.

To this end, the two shut-off valves 62, 64 are closed and the 3/2 directional valve 76 is energized so that the control pressure which is tapped from the coupling line 66 is transmitted to the piloted check valve 68 and to the logic valve 74. Consequently, the logic valve 74 is closed, whereas the check valve 48 is opened. Therefore, the coupling line 66 is also open in the direction towards the first chamber 10 so that the pressure medium which is re-pressurized by the displacement machine 60 pressurizes the first chamber 10 and the fourth chamber 14 equally.

Figure 4:
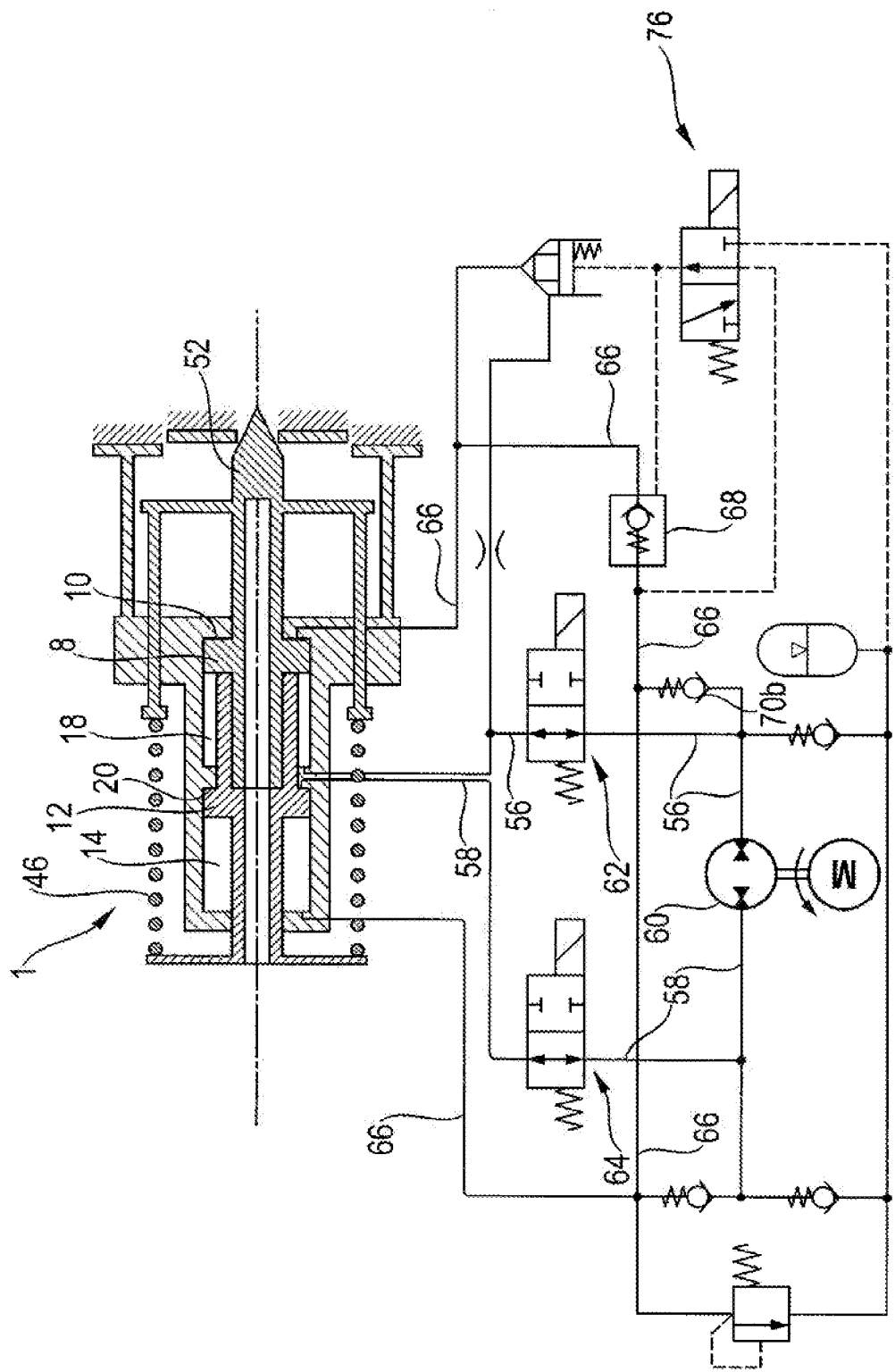
FIG. 4 shows the actuating device according to FIG. 2 in a third operating state.

FIG. 4 shows the control readiness or the control operation of the actuating device according to FIGS. 2 and 3. To this end, the two shut-off valves 62, 64, after the pressure build-up according to FIG. 3, have been switched into their de-energized open position so that the second chamber 18 is connected to the displacement machine 60 via the first main line 56 and the third chamber 20 is connected to the displacement machine 60 via the second main line 58. The motor M can drive the displacement machine 60 bi-directionally so that the valve body 52 can be steplessly adjusted via the four-chamber cylinder 1. In this case, the two pistons 8, 12 and the emergency spring 46 are always moved together. The 3/2 directional valve 76, after the pressure build-up according to FIG. 3, remains in the energized position, as a result of which the piloted check valve 68 remains open. As a result, with each adjustment movement of the valve body 52 pressure medium can be displaced between the first chamber 10 and the fourth chamber 14 via the coupling line 66.

Figure 5:
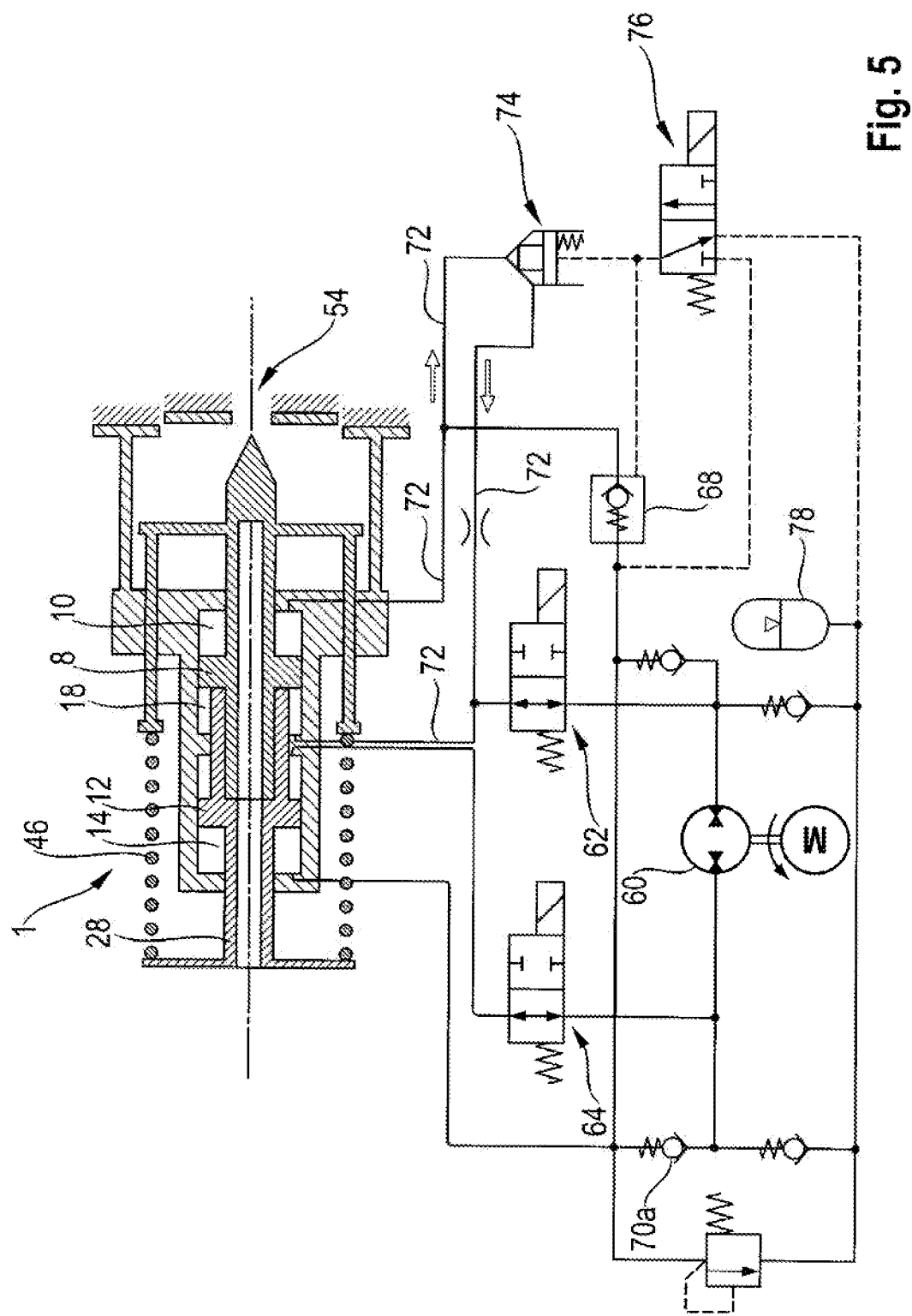
FIG. 5 shows the actuating device according to FIG. 2 in a fourth operating state.

FIG. 5 shows the actuating device according to FIGS. 2 to 4 during normal operation in which a fast closing of the main valve 54 is carried out. To this end, the two shut-off valves 62, 64 and the 3/2 directional valve 76 are switched in each case into their de-energized, initial spring-pretensioned positions. The motor M receives no supply and the displacement machine 60 stops. The control port of the logic valve 74 is relieved to the low-pressure accumulator 78 via the 3/2 directional valve 76 so that a connection from the first chamber 10, via the emergency closing line 72, to the second chamber 18 is open. The emergency spring 46 can now move the first piston 8 into the closed position (to the right in FIG. 5). In this case, the spring is supported via the second outer piston rod 28 and the second piston 12 on the pressure medium which is locked in the fourth chamber 14. This pressure medium cannot escape since the check valves 68 and 70a and 70b are closed.

A special case, in which the emergency spring 46 is tensioned and locked within a short space of time and also a defined position of the valve body 52 is to be reached in a controlled manner, is also possible.

Figure 6:
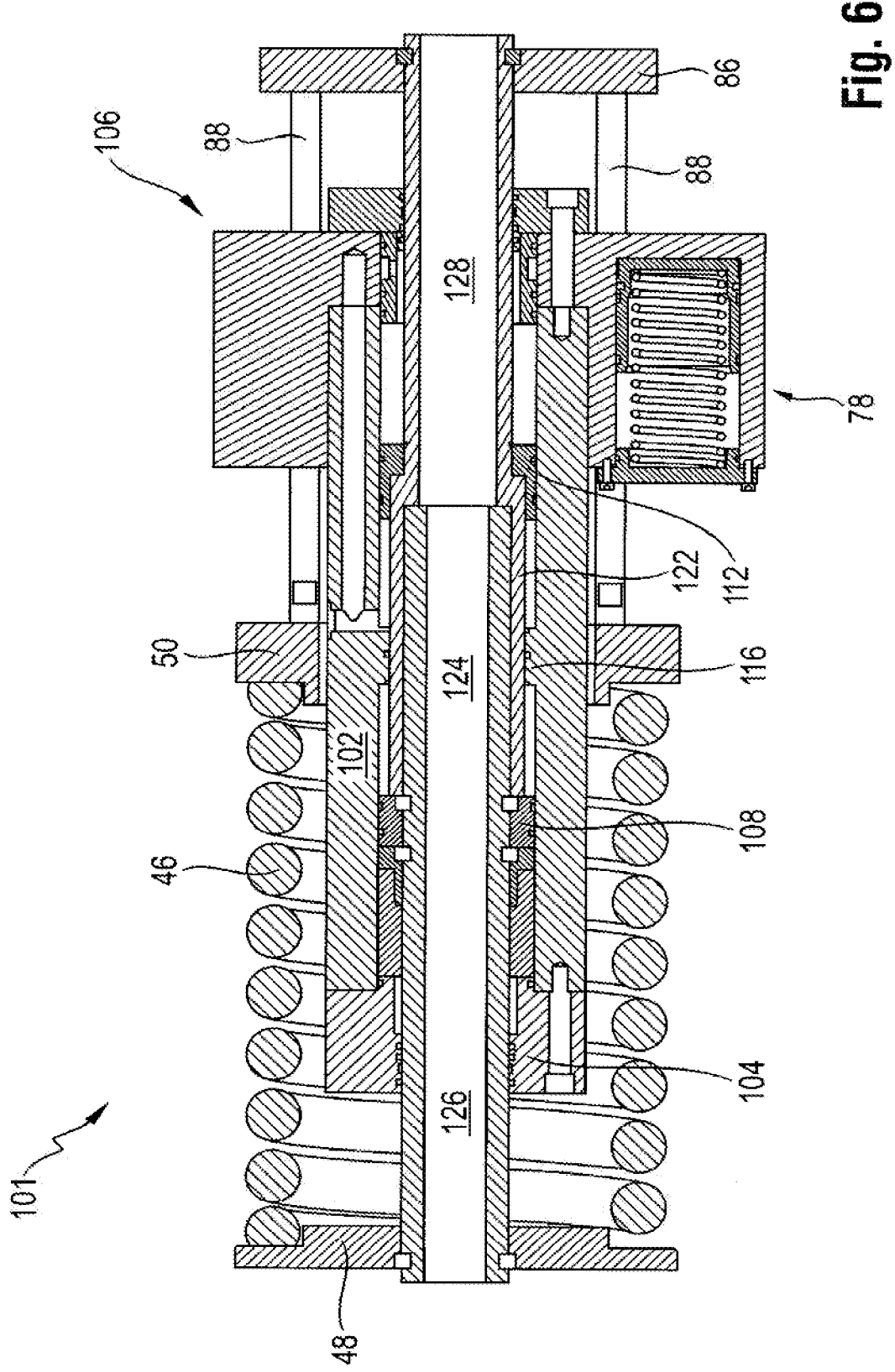
FIG. 6 shows a second exemplary embodiment of the four-chamber cylinder according to the disclosure in a laterally sectioned view.

FIG. 6 shows a second exemplary embodiment of the four-chamber cylinder 101 according to the disclosure in a laterally sectioned view. The essential difference to the first exemplary embodiment is to be seen by the fact that the first piston rod 124 is arranged on the side facing away from a flange 86, whereas the second piston rod 122 is arranged on the side facing the flange 86. Therefore, the first piston rod 124 (in FIG. 6) immerses into the second piston rod 122 from the left. The valve body 52 (not shown in FIG. 6) is fastened on the flange 86. As a result of this reverse installation, the effective direction of the emergency spring 46 is altered during emergency operation. Whereas the emergency spring 46 in the first exemplary embodiment extends the valve body 56 during emergency operation, it retracts it in the case of the second exemplary embodiment.

The flange 86 is fastened on the second spring abutment 50 via pins 88 which extend through the second end-side cover 106 of the cylinder 102. The low-pressure accumulator 78, which is designed as a piston accumulator, is integrated into the second end-side cover 106.

The first piston rod 124 is formed as a continuous tube with the first outer piston rod 126, wherein the first piston 108 is seated upon the tube. The second piston rod 122 is also formed as a continuous tube with the second outer piston rod 128, wherein the second piston 112 is seated upon a step of the tube.

Figure 7:
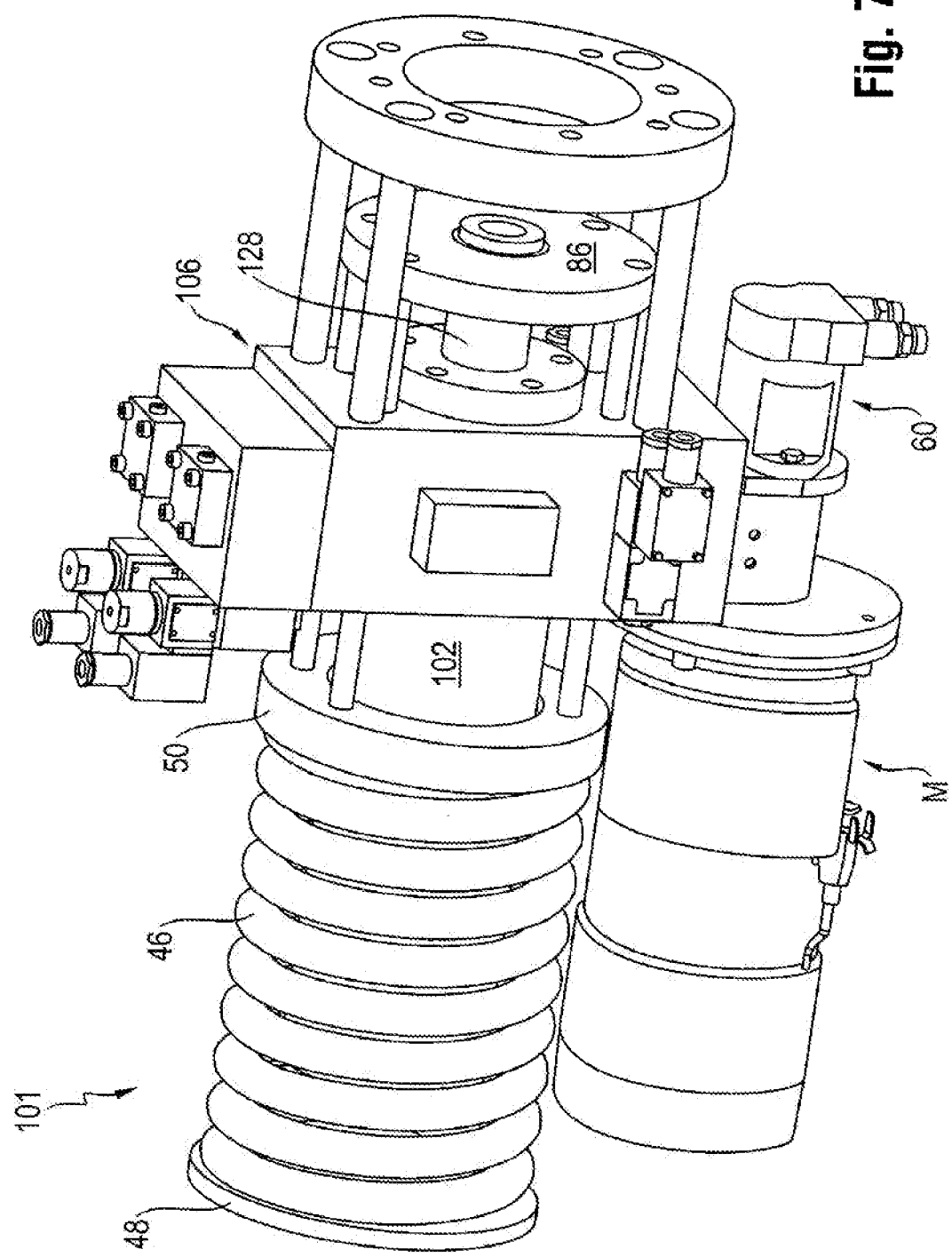
FIG. 7 shows the second exemplary embodiment according to FIG. 6 in a perspective view.

FIG. 7 shows the second exemplary embodiment according to FIG. 6 in a perspective view. Shown in addition to the view in FIG. 6 in this case is a fixed ring 90 via which the four-chamber cylinder 101 can be fastened on the main valve 54 (cf. FIG. 2). The displacement machine 60 and the motor M are also shown.

Figure 8:
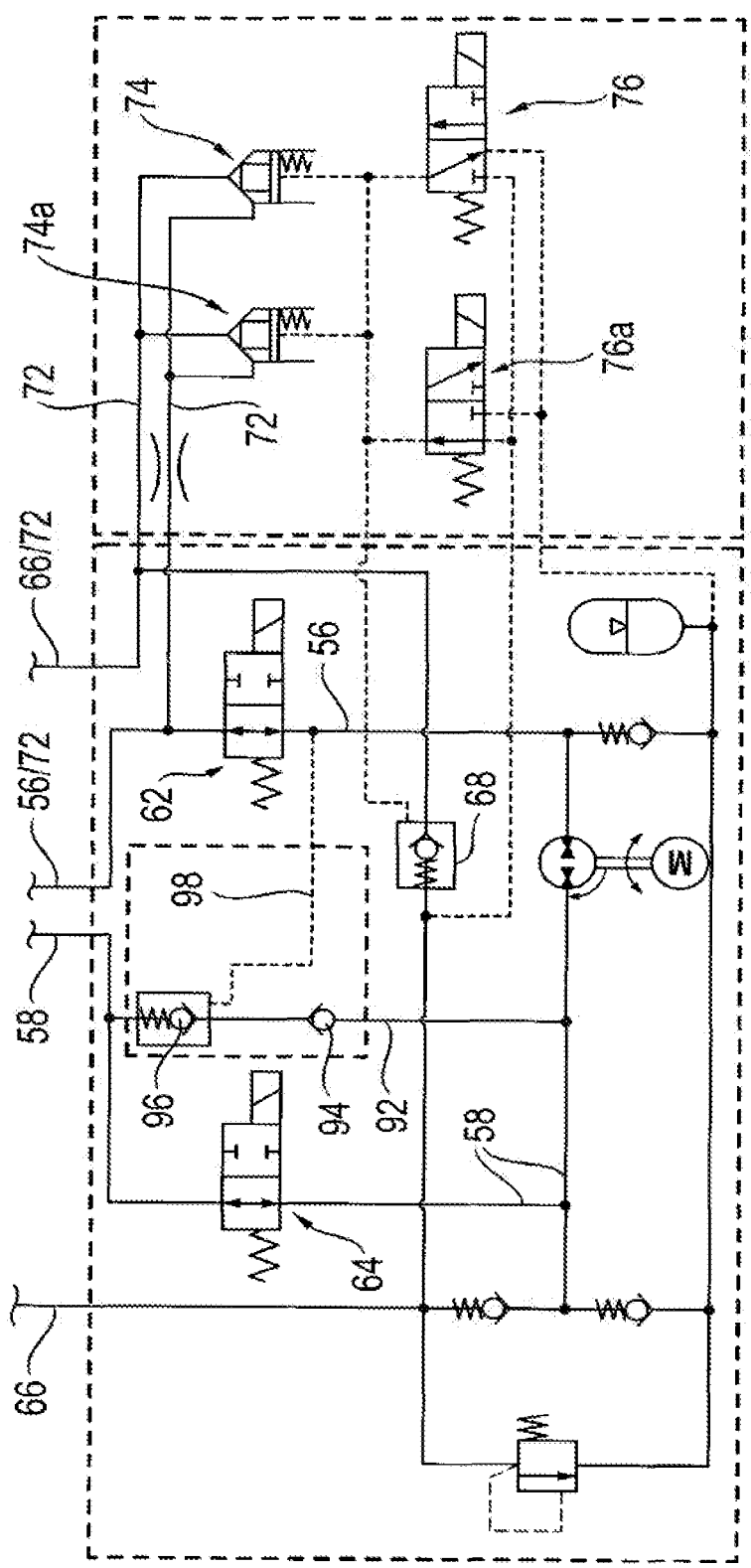
FIG. 8 shows a hydraulic circuit of a second exemplary embodiment of the actuating device according to the disclosure.

FIG. 8 shows a hydraulic circuit of a second exemplary embodiment of the actuating device according to the disclosure. It serves for supplying both four-chamber cylinders 1; 101 of the previous figures and to this end is connected to these via both main lines 56, 58 and via the coupling line 66. A second 3/2 directional valve 76a and a second logic valve 74a are provided in addition to the hydraulic circuit of the first exemplary embodiment according to FIGS. 2 to 5. Via the second logic valve 76a, the emergency closing line 72 can be opened in parallel with or alternatively to the first logic valve 74.

An immediate control readiness of the four-chamber cylinder according to the disclosure is achieved in the case of the second exemplary embodiment by provision being made, parallel to the second shut-off valve 64 of the second main line 58, for a line 92 in which are provided a check valve 94 which opens from the third chamber 20 to the displacement machine 60, and a spring-pretensioned check valve 96 which opens from the displacement machine 60 to the third chamber 20. The spring-pretensioned check valve 96 can be operated to open via a control line 98, which is connected to the first main line 56, in dependence upon the pressure which prevails between the displacement machine 60 and the first shut-off valve 62.

The disclosure is for a four-chamber cylinder with emergency closing function, which has two piston devices which in each case have a piston and a piston rod. Each piston delimits two reciprocally oppositely acting chambers, of which during control operation one serves for pressing one piston device onto the other piston device, whereas the respectively other chamber serves for moving the mutually contacting piston devices in one of the two actuating directions. The two piston rods are in alignment with each other, wherein the one piston rod can immerse telescopically in a guide recess of the other piston rod. During control operation of the four-chamber cylinder, an emergency spring is held under tension by the two piston devices being pressed against each other. Created as a result is a compact four-chamber cylinder which serves for adjustment of a valve, a turbine or a process valve, upon which are made increased safety demands. With the four-chamber cylinder according to the disclosure, an actuating movement is possible via the emergency spring even in the event of a supply failure, wherein the four-chamber cylinder can be installed and operated bi-directionally.

LIST OF DESIGNATIONS

1; 101 Four-chamber cylinder
2; 102 Cylinder tube
4; 104 First end-side cover
6; 106 Second end-side cover
8; 108 First piston
10 First chamber
12; 112 Second piston
14 Fourth chamber
16; 116 Radial constriction
18 Second chamber
20 Third chamber
22; 122 Second piston rod
24; 124 First piston rod
26; 126 First outer piston rod
28; 128 Second outer piston rod
30 First pressure surface
32 Third pressure surface
34 Fourth pressure surface
36 Partial pressure surface
38 Differential pressure surface
40 Recess
42 Seal
44 End section
46 Emergency spring
48 First spring abutment
50 Second spring abutment
52 Valve body
54 Main valve
56 First main line
58 Second main line
60 Displacement machine
62 First shut-off valve
64 Second shut-off valve
66 Coupling line
68 Piloted check valve
70a, 70b Check valve
72 Emergency closing line
73 Restrictor
74; 74a Logic valve
76; 76a 3/2 directional valve
78 Low-pressure accumulator
80 First replenishing valve
82 Second replenishing valve
84 Pressure limiting valve
86 Flange
88 Pin
90 Ring
92 Line
94 Check valve
96 Spring-pretensioned check valve
98 Control line
M Motor

What is claimed is:

1. A four-chamber cylinder, comprising:
    a first piston device including a first piston and a first piston rod, the first piston delimiting a first chamber and a second chamber;
    a second piston device including a second piston and a second piston rod aligned with the first piston rod, the second piston delimiting a third chamber and a fourth chamber; and
    a compressive-elastic emergency element,
    wherein the second chamber is configured to act in an opposing manner to the first chamber;
    wherein the third chamber is configured to act in an opposing manner to the fourth chamber;
    wherein the first piston rod, at least in sections, is movably positioned in a guide recess of the second piston rod; and
    wherein the first piston device, via the first chamber, and the second piston device, via the fourth chamber, are configured to move towards each other and held with each other to tension the compressive-elastic emergency element.

2. The four-chamber cylinder according to claim 1, wherein:
    a partial pressure surface of a total pressure surface is defined between the second chamber and the first piston; and
    the second piston rod defines an end face that covers the partial pressure surface.

3. The four-chamber cylinder according to claim 2, wherein the partial pressure surface is defined in a piston-side recess, the end face being configured to be immersed into the piston-side recess.

4. The four-chamber cylinder according to claim 2, wherein a third pressure surface is defined between the third chamber and the second piston, the third pressure surface being the same size as the total pressure surface, less the partial pressure surface.

5. The four-chamber cylinder according to claim 2, wherein a first pressure surface is defined between the first chamber and the first piston, the first pressure surface being the same size as the total pressure surface.

6. The four-chamber cylinder according to claim 2, wherein a fourth pressure surface is defined between the fourth chamber and the second piston, the fourth pressure surface being the same size as the total pressure surface.

7. The four-chamber cylinder according to claim 1, further comprising:
a first end-side cover and a second end-side cover,
wherein the first chamber and the fourth chamber are both defined as an annulus;
wherein the first piston device further includes a first outer piston rod delimiting the first chamber, the first outer piston rod being configured to penetrate the first end-side cover; and
wherein the second piston device further includes a second outer piston rod delimiting the fourth chamber, the second outer piston rod being configured to penetrate the second end-side cover.

8. The four-chamber cylinder according to claim 7, wherein the first piston rod and the first outer piston rod are formed as a one-piece rod or as a one-piece tube.

9. The four-chamber cylinder according to claim 7, wherein the second piston rod and the second outer piston rod are formed as a one-piece rod or as a one-piece tube.

10. The four-chamber cylinder according to claim 7, wherein:
the first outer piston rod and the second outer piston rod have equal diameters;
a region of the first chamber and a region of the fourth chamber have equal diameters; and
the first piston and the second piston have equal outside diameters.

11. The four-chamber cylinder according to claim 1, wherein:
the second chamber and the third chamber are separated from each other by a radial constriction; and
the second piston rod is guided in the radial constriction.

12. A hydraulic actuating device, comprising:
a four-chamber cylinder, including:
a first piston device having a first piston and a first piston rod, the first piston delimiting a first chamber and a second chamber;
a second piston device having a second piston and a second piston rod aligned with the first piston rod, the second piston delimiting a third chamber and a fourth chamber; and
a compressive-elastic emergency element,
wherein the second chamber is configured to act in an opposing manner to the first chamber;
wherein the third chamber is configured to act in an opposing manner to the fourth chamber;
wherein the first piston rod, at least in sections, is movably positioned in a guide recess of the second piston rod; and
wherein the first piston device, via the first chamber, and the second piston device, via the fourth chamber, are configured to move towards each other and held with each other to tension the compressive-elastic emergency element; and
a displacement machine configured to alternately supply the second chamber, via a first main line, and the third chamber, via a second main line.

13. The hydraulic actuating device according to claim 12, further comprising:
a coupling line connecting the first chamber and the fourth chamber,
wherein the displacement machine is configured to commonly supply and pressurize the first chamber and the fourth chamber with a pressure medium via the coupling line.

14. The hydraulic actuating device according to claim 13, wherein the coupling line interconnects and hydraulically couples or locks the first chamber and the fourth chamber.

15. The hydraulic actuating device according to claim 13, wherein the coupling line has a piloted check valve configured to open from the first chamber to the fourth chamber via one or two 3/2 directional valves.

16. The hydraulic actuating device according to claim 15, further comprising:
an emergency closing line having a logic valve that interconnects the first chamber and the second chamber,
wherein the logic valve is configured to be unloaded or operated to open via the one or two 3/2 directional valves.

17. The hydraulic actuating device according to claim 12, further comprising:
an accumulator,
wherein the first main line and the second main line are each connected to the accumulator via a respective replenishing valve.

18. The hydraulic actuating device according to claim 12, wherein:
the first main line and the second main line each have a shut-off valve;
a line having a check valve opens from the third chamber to the displacement machine, the line being parallel to the shut-off valve of the second main line; and
a spring-pretensioned check valve opens from the displacement machine to the third chamber and is configured to open via a control line connected to the first main line.

* * * * *